US009460629B2

(12) United States Patent
Chircop et al.

(10) Patent No.: US 9,460,629 B2
(45) Date of Patent: Oct. 4, 2016

(54) FLIGHT TRAJECTORY OPTIMIZATION AND VISUALIZATION TOOL

(71) Applicant: University of Malta, Msida (MT)

(72) Inventors: Kenneth Chircop, Dingli (MT); David Zammit-Mangion, Mellieha (MT); Alan Muscat, Pembroke (MT)

(73) Assignees: UNIVERSITY OF MALTA, Msida (MT); QUAERO LTD., Birkirkara (MT)

( * ) Notice: Subject to any disclaimer, the term of this patent is extended or adjusted under 35 U.S.C. 154(b) by 0 days.

(21) Appl. No.: 14/802,624

(22) Filed: Jul. 17, 2015

(65) Prior Publication Data

US 2016/0019795 A1    Jan. 21, 2016

Related U.S. Application Data

(60) Provisional application No. 62/026,132, filed on Jul. 18, 2014.

(51) Int. Cl.
*G08G 5/00* (2006.01)
*G01C 23/00* (2006.01)
*G05D 1/02* (2006.01)

(52) U.S. Cl.
CPC ............. *G08G 5/0039* (2013.01); *G01C 23/00* (2013.01); *G08G 5/0008* (2013.01); *G08G 5/0013* (2013.01); *G08G 5/0034* (2013.01); *G01C 23/005* (2013.01); *G05D 1/0202* (2013.01); *G08G 5/0021* (2013.01); *G08G 5/0026* (2013.01)

(58) Field of Classification Search
CPC ............. G08G 5/0034; G08G 5/0039; G01C 23/005; G05D 1/0202
See application file for complete search history.

(56) References Cited

U.S. PATENT DOCUMENTS

| 4,825,374 A * | 4/1989 | King | G01C 23/005 701/16 |
|---|---|---|---|
| 6,134,500 A * | 10/2000 | Tang | G06Q 10/047 701/3 |
| 6,163,743 A * | 12/2000 | Bomans | G01C 23/00 701/14 |
| 6,163,744 A * | 12/2000 | Onken | G01C 23/00 701/10 |
| 7,272,491 B1 * | 9/2007 | Berard | G08G 5/0034 701/14 |
| 7,366,591 B2 * | 4/2008 | Hartmann | G05D 1/0607 701/4 |
| 7,650,232 B1 * | 1/2010 | Paielli | G01C 23/005 701/528 |
| 8,185,298 B2 * | 5/2012 | Jha | G08G 5/0034 701/121 |
| 8,600,675 B1 * | 12/2013 | Borghese | G01C 23/00 701/528 |
| 2003/0139877 A1 * | 7/2003 | Dwyer | G08G 5/0034 701/4 |

(Continued)

OTHER PUBLICATIONS

International Search Report PCT/ISA/210 and Written Opinion of the International Searching Authority PCT/ISA/237 for International Application No. PCT/IB2015/055453 dated Oct. 27, 2015.

*Primary Examiner* — Dale W Hilgendorf
(74) *Attorney, Agent, or Firm* — Harness, Dickey & Pierce, P.L.C.

(57) ABSTRACT

A method and system and tools for optimizing an aircraft flight trajectory that determine an advantageous flight profile that takes into account developing operational conditions, air traffic constraints and aircraft performance in a timely manner that can allow tactical flight plan changes to be incorporated without unduly introducing operational or financial penalties to the operator.

22 Claims, 7 Drawing Sheets

(56) References Cited

U.S. PATENT DOCUMENTS

| | | | |
|---|---|---|---|
| 2008/0288164 A1* | 11/2008 | Lewis | G08G 5/0034 701/120 |
| 2008/0312776 A1* | 12/2008 | Sylvester | G01C 23/00 701/3 |
| 2009/0150012 A1* | 6/2009 | Agam | G01C 23/005 701/3 |
| 2010/0198433 A1* | 8/2010 | Fortier | G01C 23/00 701/3 |
| 2012/0059535 A1* | 3/2012 | Jackson | G08G 5/0039 701/3 |
| 2012/0143505 A1 | 6/2012 | Giovannini et al. | |
| 2013/0226373 A1* | 8/2013 | Bollapragada | G06Q 10/047 701/3 |
| 2014/0081569 A1* | 3/2014 | Agrawal | G08G 5/0034 701/467 |
| 2014/0163850 A1 | 6/2014 | Sawhill et al. | |
| 2014/0277853 A1* | 9/2014 | Castillo-Effen | G08G 5/0034 701/3 |

* cited by examiner

| Fuel-Optimized Flight Plan | | | |
|---|---|---|---|
| WPT | SPD (CAS/Mach) | FL | Time |
| VELAD | 0.78 | 389.99 | 01:22 |
| TINTO | 0.77 | 389.92 | 01:27 |
| POKAV | 0.77 | 389.92 | 01:32 |
| BETOT | 0.78 | 389.85 | 01:36 |
| RUVIP | 0.77 | 389.87 | 01:39 |
| RONAB | 0.77 | 389.91 | 01:40 |
| GIANO | 0.77 | 389.81 | 01:49 |
| TOD: -42.32Nm PALERMO | 0.76 | 389.93 | 01:51 |
| PALERMO | 0.77 | 388.35 | 01:57 |
| ALOKU | 0.63 | 356.57 | 02:04 |
| MARON | 0.58 | 335.38 | 02:05 |
| EKOLA | 197.33 | 217.6 | 02:13 |
| GZO | 200.85 | 127.23 | 02:20 |
| MINDI | 203.09 | 66.22 | 02:25 |
| PALMA | 215.9 | 43.76 | 02:26 |

FLIGHT TRAJECTORY OPTIMIZATION AND VISUALIZATION TOOL

FIELD OF THE INVENTION

The present invention relates to a tool for optimizing airplane flight trajectories and visualizing the optimized trajectories in quasi real time.

BACKGROUND OF THE INVENTION

The operation of current commercial aircraft is highly automated, with the mission and trajectories flown being managed by a Flight Management System (FMS). Consequently, FMSs are programmed with flight plans generated by the aircraft operator, one of which will be chosen, adapted or input directly by the crew to be flown by the aircraft for the particular flight. The flight plans will normally have been designed in a manner to be advantageous to the aircraft operator from an economic perspective. Parameters such as climb, cruise and descent speeds, as well as operating altitudes, define the time of flight and fuel burn on the particular mission and these parameters are usually selected according to operational costs and other constraints (such as aircraft scheduling) in order to accommodate the aircraft operator's interests and needs. The flight plan will normally be submitted to the relevant Air Navigation Service Provider (ANSP) and is agreed upon prior to the start of the mission.

An aircraft, however, rarely flies according to the agreed flight plan without any alterations. This is because tactical variations from the flight plan invariably occur. Such variations may be due to factors such as operational delays, changes in aircraft operating weight, variations in weather conditions and new air traffic constraints. Factors such as delays, weight, air traffic control (ATC) constraints and winds normally effect the vertical profile of a flight plan, resulting in changes in the aircraft's speed and altitude schedules, whilst air traffic constraints and bad weather often also result in deviations in the plan path flown.

Tactical deviations from the flight plan often result in a penalty in terms of fuel burn, emissions and operating costs. The penalties arise from limitations in current technology and practice.

Airline operators often use what is referred to as the Cost Index (CI) to establish the preferred operating point (speed, time of flight and thus trip fuel burn) of a particular flight. The CI is an arbitrary parameter that relates time-related costs with fuel costs. By selecting a particular CI, the operator will be selecting the time of flight and one programmed in the FMS, the system will schedule the operating speeds and altitudes according to the operating weight and reported winds and temperatures entered into it. Due to the nature of the concept, the CI is often set for a particular flight or group of flights and is often not altered during their progress. This, naturally, may result in the aircraft effectively being flown less efficiently than possible.

Whilst the CI is a useful tool that allows the operator to select advantageous operating points of the aircraft, current methods that generate flight profiles based on this concept are limited in their ability to identify the most advantageous flight profiles that need to be flown in the prevailing conditions operating conditions. This is due to a number of factors, including the limited processing power on current technology flight management systems, which results in methods used being simple and approximate in nature.

ATC constraints may also introduce operational and cost penalties. ATC is primarily concerned with ensuring safe separation between aircraft and, accordingly, issue tactical instructions that constrain the flight path of aircraft when this is necessary. While ATC may be sensitive to expeditious routing, it does not explicitly take the operational costs of airlines into account. Tactical instructions, such as lateral deviations in the planned path and speed and altitude constraints are issued that, with current technology, do not allow sufficient time for the re-planning of the flight by the aircraft operator or pilot in a way to reduce the impact of these instructions on the operating costs of the flight.

SUMMARY OF THE PRESENT INVENTION

From a performance perspective, it is understood that by improving the planning of a flight, at both strategic and tactical levels, significant reductions of fuel burn and emissions can be achieved, the former of the order of several percentage points over current levels.

Current operating practices and supporting technology, therefore, can be considered unsatisfactory and need to be complemented by a means that can enable better selection of flight trajectories and operating points for specific flight conditions at both tactical and strategic levels, thus allowing the aircraft to be flown more advantageously in terms of a selected criterion (such as cost) or criteria. The present invention is intended to mitigate at least some of the difficulties associated with current systems and practices.

Accordingly, the present invention, discloses a method and system that generates data pertaining to flight trajectories that are optimized according to one or a plurality of criteria (also referred to as objectives) whilst taking into account up-to-date information regarding the operating conditions. In this way, used by pilots, airline operations centers (AOCs) and ATC, flight trajectories that are more advantageous to the operator can be successfully flown.

The subject matter of the present application recognizes the previously unmet need and provides tools, systems and methods that can calculate an advantageous flight profile that takes into account developing operational conditions, air traffic constraints and aircraft performance in a timely manner that can allow tactical flight plan changes to be incorporated without unduly introducing operational or financial penalties to the operator.

Current practice focuses on using the CI to balance fuel cost with all other time dependent costs to find the best operating point for the operator (i.e. balance between time of flight and cost of fuel for faster flights). Aircraft today are flown on a selected cost index, which in turn defines the speed and vertical profile of the aircraft. Due to the limited processing power of current flight management systems, algorithms generating the speed and vertical profiles are relatively simple and cannot generate outputs that are sufficiently close to a theoretical optimal output. Accordingly, known methods of operation do not provide the best gains.

Operationally, in order to operate at the optimal operating point, the flight trajectory and schedule needs to be known. These factors, however, are often tactically altered by air traffic constraints. Currently, air traffic controllers do not plan restrictions sufficiently early to support the efficient planning of optimal flight. As a result, aircraft operators may plan for aircraft to fly optimally, only for their plans to be changed by tactical instructions by ATC. There is value therefore, in enabling the planning of ATC restrictions in advance so that, in conjunction with the generation of flight trajectories closer to the theoretical optimum, aircraft can be flown in a more efficient manner.

Also, consistently rising fuel prices have driven airlines into rethinking their business models, adopting approaches that reduce costs, as well as the impact of their operations on the environment. An approach that offers great potential and has attracted the attention of the aviation industry is the management of trajectories for "green" operations.

The Flight Trajectory Optimization and Visualization Tool which is the subject of the present application is capable of optimizing the trajectories of aircraft, thus allowing the tool to be used by various stakeholders, such as pilots in the cockpit and air traffic controllers and staff in airline operating centers on the ground.

In order to be used as a ground based ATC tool or airline operations center tool, data pertaining to the aircraft and operating conditions (e.g., weight and cost index) may need to be obtained from the AOC and/or the flight crew. Output profiles generated by the tool when used on the ground can then be communicated to the aircraft in a plurality of ways, such as under existent procedures via voice radio or via the use of digital data links. This may be done either in direct communication with the aircraft or via the AOCs.

The present invention is intended to mitigate at least some of the difficulties associated with current systems. For the purposes of this invention, the flight trajectories of interest are expected to primarily be the climb and descent although other phases of flight, including cruise, are also included.

Typical inputs to the present invention may include aircraft weight, time of flight or cost index, weather conditions (including wind), ATC constraints and the intended flight plan. The output of the tool is an optimized trajectory profile that identifies salient points along the trajectory profile, such as top of climb and top of descent points and other operational factors, such as the speed schedule and flight constraints.

The merits of a ground-based optimization tool become evident when considering the operational environment, as well as certification aspects of technology. For example, currently ATC instructs a flight crew with constraints that are based on the need for aircraft separation and naturally upset the CI calculations and business model of the aircraft operator. More seriously, often ATC currently do not have objective means to introduce constraints that are sensitive to the airline business model and, as a result, often issue constraints that impact the operator negatively. Consequently, an ATC tool that is sensitive to such issues would be highly beneficial. This approach, whilst conceptually enabling ATC, also avoids the complications of aircraft certification besides that of equipage. Furthermore, the present invention is designed to integrate seamlessly with current operational practices, which is advantageous.

The Flight Trajectory Optimization and Visualization Tool can also be provided as an auxiliary tool on a tablet (or similar device) for the flight crew to use during flight. Pilots already carry and use tables for planning purposes today and the Flight Trajectory Optimization and Visualization Tool will be in line with current practices so as to be usable on such devices.

In an example embodiment, the Flight Trajectory Optimization and Visualization Tool provides a method and system that identifies, in a timely manner, an optimized flight trajectory and profile to allow flight crews to fly more efficient trajectories, thus overcoming at least some of the limitations of prior art.

In an example embodiment, there is provided a method that determines, during pre-flight and/or flight, an optimized trajectory and associated operating point of an aircraft, according to aircraft performance indicia, operating conditions and operational constraints.

By taking into account aircraft performance and up-to-date operating conditions and operational constraints simultaneously, the method is capable of determining more advantageous flight trajectories and profiles according to criteria set by the operator, such as fuel burn, time of flight, noise, emissions or cost index.

The operating conditions considered may include, but are not limited to, atmospheric conditions such as temperature, pressure, wind and other weather conditions, as well as aircraft weight.

The operational constraints considered may include, but are not limited to, air traffic constraints, any routing constraint, flight time and ability to fly particular flight profiles. Advantageously, the flight plan or path followed by the aircraft may be stored in a database and/or memory that may contain waypoint (WPT), speed, heading and altitude data.

BRIEF DESCRIPTION OF THE DRAWINGS

An exemplary embodiment of the invention will now be described with reference to the accompanying drawings, in which.

DETAILED DESCRIPTION OF PREFERRED EMBODIMENTS

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures unless otherwise indicated. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as circuits, program modules or functional processes include routines, programs, objects, components, data structures, etc., that perform particular tasks or implement particular abstract data types and may be implemented using existing hardware. The operations be implemented using existing hardware in existing electronic systems (e.g., display drivers, System-on-Chip (SoC) devices, SoC systems, electronic devices, such as personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), SoCs, field programmable gate arrays (FPGAs), computers, or the like, configured as special purpose machines to perform the functions described herein as well as any other well-known functions of these elements. In at least some cases, CPUs, SoCs, DSPs, ASICs and FPGAs may generally be referred to as processing circuits, processors and/or microprocessors.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "memory," "memory unit," "storage medium," "computer readable storage medium," and the like, may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

In an example present embodiment, the Flight Trajectory Optimization and Visualization Tool (hereinafter "the tool") is described for use on the ground by Air Traffic Control personnel. It is understood, however, that variations of the tool can be implemented for use on the ground by airlines (such as AOCs), as well as airborne on the flight deck. For example, the tool can be provided on a portable computing device, such as a tablet, mobile telephone, laptop computer (or other similar device) for the flight crew to use during flight.

Figure 1:
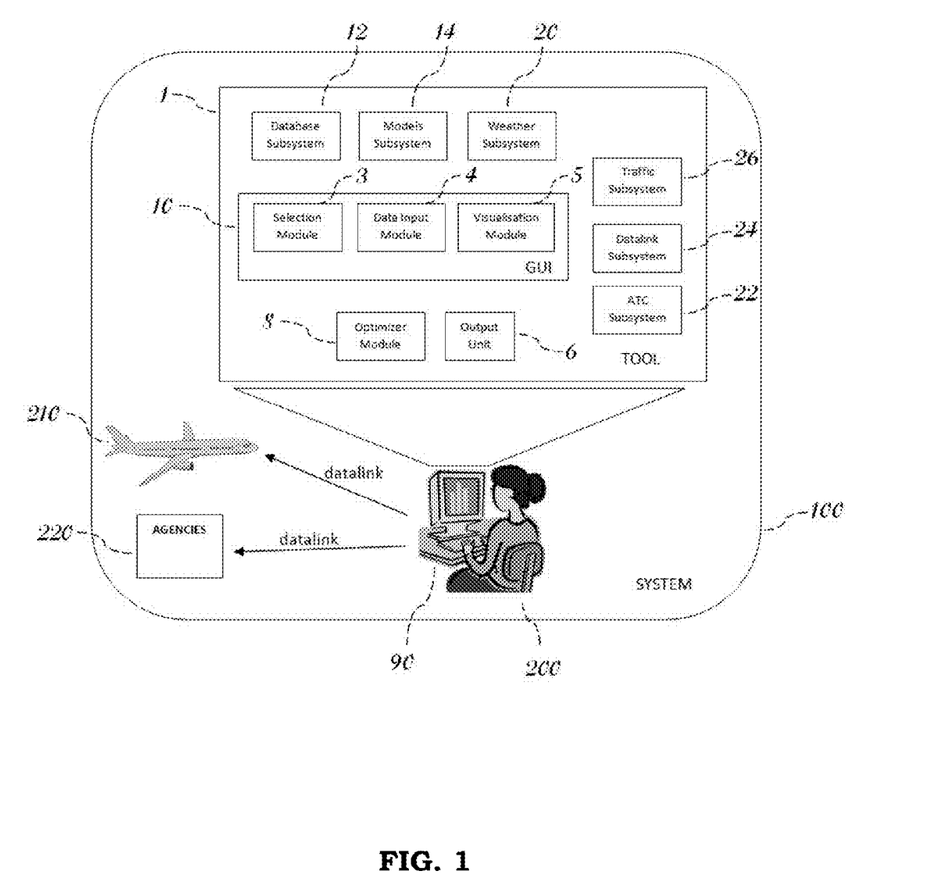
FIG. 1 illustrates an example embodiment of a system that includes the Flight Trajectory Optimization and Visualization Tool.

Certain parameters and constraints associated with the optimization process, such as ATC constraints or aircraft operating weight may need to be communicated verbally via voice radio or via datalink between the AOC, ATC and the flight deck. Furthermore, in the case of use of the tool by the AOC or on the flight deck, the flight crew will need to request new clearances from ATC to execute an optimal trajectory that may deviate from that for which the aircraft is cleared to fly. It is understood that this exchange of information, whether verbal or in digital format, is carried out via one or a plurality of datalinks as shown in FIG. 1. It is also contemplated herein that the subject matter of the present application may be integrated in a FMS and linked with the automatic guidance system of the aircraft. When this is not the case, pilots will need to program the flight guidance system to follow the trajectory profile they identify (and not follow the FMS).

As shown in FIG. 1, a present embodiment of the flight trajectory optimization and visualization tool 1 (hereinafter "the tool") organised as a ground-based tool used for optimizing aircraft trajectories comprises part of a system 100 that includes a computing device 90, the user 200, the ownship (the aircraft for which the trajectory is being optimized) and other aircraft 210, as well as other agencies 220 providing data, such as meteorological offices. It is understood that other agencies 220 is also considered to include ATC and AOCs, which may provide traffic and other data to the computing device 90. In an example embodiment, the computing device 90 on which the tool 1 is installed is a personal computer (PC) that may further form part of a ground based ATC or AOC tool.

It is understood that in another embodiment, the tool 1 may be installed as an airborne tool, either integrated in aircraft systems or used using portable computational devices such as laptops and tablets. It is also understood that this and other embodiments may comprise a subset of the embodiment of FIG. 1. For example, when the tool is used to optimise only one aircraft's (the ownship's) flight trajectory, other aircraft 210 may not form part of the system. Likewise, the system may be 'stand-alone' and not linked to other agencies 220. By way of a non-limiting example, the following figures and embodiments describe a ground based tool, as it essentially comprises a super-set of the airborne embodiment.

Figure 2:
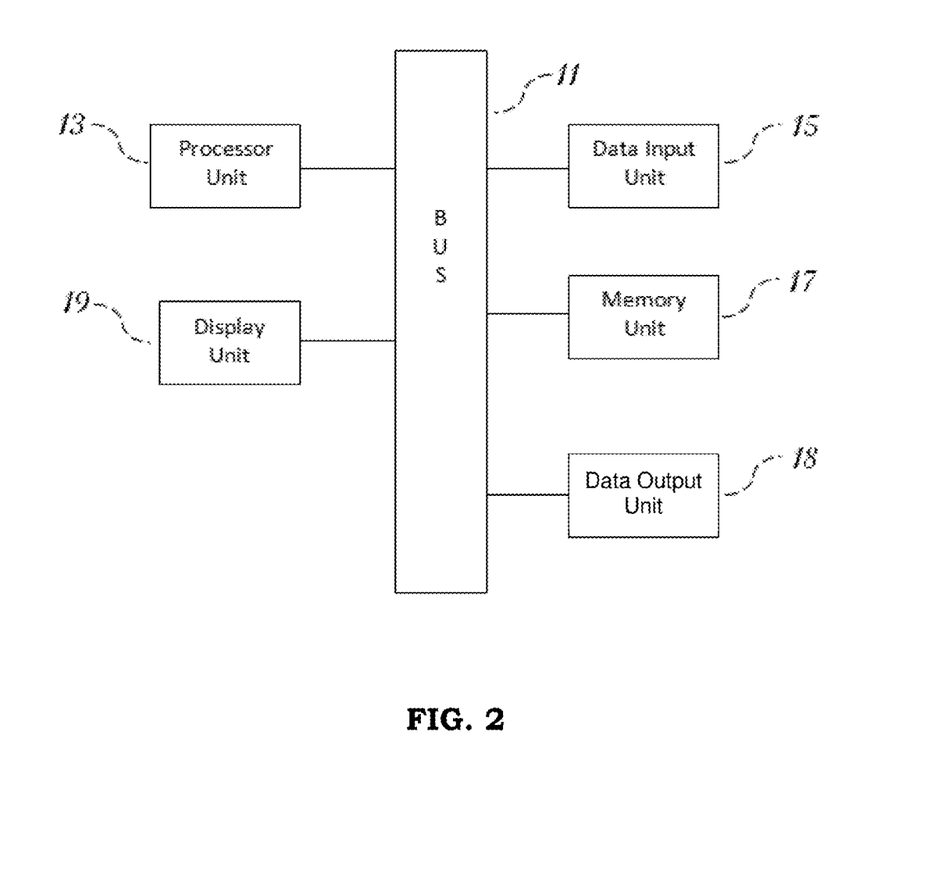
FIG. 2 shows an example embodiment of the computing device in which the tool in FIG. 1 may be installed and executed.

FIG. 2 is a diagram illustrating an example embodiment of the computing device 90 in which the tool 1 may be installed and executed. It is understood that the computing device 90 may physically comprise of a plurality of physical computational devices such as PCs or high performance computers. In another embodiment, the computing device 90 is a portable computing device such as a tablet, laptop computer, etc. Referring to FIG. 2, in a present embodiment, the computing device 90 includes a data bus 11; an data input unit 15 that may include one or a plurality of devices such as, but not limited to, a keyboard, mouse, tracker ball, touch screen and/or other input devices such as wired and/or wireless data network devices and associated sub-systems that connect the computing device 90 to other systems external to the computing device 90 such as other agencies 220; a processor 13; a memory 17 that may comprise volatile memory (RAM), non-volatile memory (ROM) and a storage device; a display 19; and a data output unit 18 that can output data in digital format to other systems and sub-systems external to the computing device 90, including other agencies 220. It is understood that the data output unit 18 may include one or a plurality of devices such as, but not limited to, wired and wireless I/O devices and sub-systems. The data input unit 15, processor 13, memory 17, display 19, and data output unit 18 may send a receive data to one another via the data bus 11.

The data input device 15 is a device that includes the necessary hardware and/or software for receiving data including, for example, user input data and traffic data, via one or more wired and/or wireless connections to one or more internal and/or external data sources. The processor 13 may be, for example, a microprocessor capable of executing instructions included in computer readable code. The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA).

The memory 17 may be any device capable of storing data including magnetic storage, flash storage, or similar, including for example, RAM, ROM, Flash memory, hard disk, or other known storage device. The display 19 may be any device capable of displaying data including, for example, a computer monitor, a tablet or personal device display, or similar. The display 19 may also include a touch screen capable of receiving user input commands, which touch screen may form part of the data input device 15.

It is understood that the data input device 15 and data output unit 18 include all necessary devices and sub-systems necessary for the disclosed functions of data input and output. For example, in the case of wireless networks, the data input device 15 and data output unit 18 include all of the necessary wireless communication subsystems including wireless transmitters and receivers, whilst for wired systems the data input device 15 and data output unit 18 include all of the infrastructure for wired communications.

The tool 1 in the system 100 may further comprise a plurality of subsystems including, but not limited to, an optimizer module 8, an output subsystem 6, a graphical user interface (GUI) 10 that includes various modules and units, a database subsystem 12, a models subsystem 14, a weather subsystem 20, an ATC subsystem 22, a datalink subsystem 24 and a traffic subsystem 26.

The database subsystem 12 may include a plurality of databases in which data pertaining, but not limited to, the aircraft and its flight path, are stored. In a present embodiment, one of the databases includes detailed aerodrome information such as, but not limited to, airspace characteristics, name, runway properties, runway heading, altitude, a list of waypoints surrounding the aerodrome, and departure and arrival procedures. Another database contains aircraft-related data, which includes information such as the manufacture name, aircraft type, model and registration or tail number. Yet another database contains the flight plan, including departure, en route and arrival information and a fourth database contains a list of specific aircraft performance and engine models (referred to as the aircraft performance and engine models (APEM) database) that reside in the models subsystem 14. These and other databases as will be further described are in communication with the GUI 10. It is understood that other data can be stored in the database subsystem 12 and that data can be organized differently or in different databases in the database subsystem 12.

In an example embodiment, an aircraft general type definitions (AGTD) database may be provided to link an aircraft with its respective aircraft and engine models via the APEM database. The AGTD database may be designed, for example, in structured query language (SQL) to provide the link. The AGTD database may contain fleet information for different airlines that collaborate with ATC in using such an optimization tool to generate optimized trajectories. The AGTD database is organized with a table for each such airline. Each table includes, for example, aircraft information specifying the aircraft manufacturer, general type (referred to as the aircraft model), series for each general type, and the aircraft registration which is unique to each aircraft and is used as the primary key. Each aircraft specified within the AGTD database relates to a particular entry in the APEM database and thus a link is created to the particular aircraft performance and engine models within the models subsystem 14 that mathematically describes the chosen aircraft. The aircraft performance and engine model parameters, which may be general for the aircraft type or subtype or specific for the particular tail number, are then passed to the optimizer 8 of the tool 1 so that each optimization process is specific to an aircraft or aircraft type.

In an example embodiment, an airspace database in the database subsystem 12 contains data that defines the airspace surrounding the aerodrome, in which trajectories are to be optimized according to the criteria of interest, such as fuel burn or emissions. The database may include, for example, a table listing a sector name, lower and upper airspace limits and the airspace area shape, which, in turn, defines the edges of the airspace area. The corners of the area are defined in latitude and longitude, with the last in the series being connected to the first to close the polygon. The position of the standard entry and exit points of the airspace may also specified, these typically marking the start and end of airways, Standard Terminal Arrival Routes (STARs) and Standard Instrument Departures (SIDs).

In an example embodiment, an aerodrome configuration database may be provided in the database subsystem 12. This database contains information that defines a particular aerodrome, the airspace surrounding the aerodrome, and the arrival and departure routes of the aerodrome. The information includes, for example, a table containing the name of the airport together with the International Air Transport Association (IATA) code and the International Civil Aviation Organization (ICAO) code, the geographic aerodrome reference point (ARP) specified in latitude and longitude in decimal degrees, the aerodrome elevation above mean sea level (AMSL), the runway designation which identifies the runways at the aerodrome and their orientation, the latitude and longitude co-ordinates at the runway thresholds, the elevation above mean sea level (AMSL) at the threshold of each runway and the country name and identifier as allocated by the International Telecommunications Union (ITU). The SIDs and STARS are also defined in detail within the aerodrome database. Data associated with these includes the route name, the type (whether arrival, departure or approach) and whether it should be followed according to specific procedures such as Required Navigation Performance Authorization Required (RNP-AR). The route is defined by a series of waypoints, each specified in latitude and longitude and may include speed and altitude constraints and the path termination at each waypoint as defined by the ARINC-424 database stored in the ATC subsystem.

The models subsystem 14 includes, but is not limited to, the afore-mentioned aircraft performance and engine models and an atmospheric model that models the International Standard Atmosphere (ISA) and allowing for temperature and other parameter deviations that are, in a present embodiment, either input by the user 200 or obtained from other agencies 220 via the input data unit 15.

The weather subsystem 20 stores and handles weather data including, for example, actual or forecast wind and temperature data. This data may, for example, be input by the user 200 or obtained from other agencies 220 via the input data unit 15. Typically such data would span from ground level up to 40,000 feet for the region of interest around the flight trajectory being optimized and allows the consideration of variations in parameters that affect aircraft and engine performance. Because the manual inputting of data is generally cumbersome, data is preferably retrieved via weather forecasts or reports in electronic format from other agencies 220 such as meteorological stations or other aircraft 210 that can relay weather information in the system 100 via the input data unit 15.

The ATC subsystem 22 contains and handles data that includes, but is not limited to, ATC constraint information pertaining to the trajectory or trajectories being optimized. Such constraints may be, but are not limited to speed, altitude and time-of-arrival constraints.

The datalink subsystem 24 is a subsystem by which the tool 1 sends and receives electronic transmissions via the data input unit 15 and data output unit 18. In a present embodiment, the said electronic transmissions include those associated with weather information and flight plans. The datalink subsystem 24 is connected to the weather, ATC and traffic subsystems 20, 22 and 26, as well as with the GUI 10 within the tool 1. The datalink can be wired (in the case of land-based communication) or wireless. In the present embodiment for ATC use, the datalink subsystem 24 within the tool 1 resides in a PC 90 that is electronically equipped to transmit and receive data over a wired ETHERNET communication link that further connects to standard industrial hardware providing wireless communication with other aircraft 210.

The traffic subsystem 26 stores and handles information regarding traffic in the vicinity of or within the aerodrome or area of interest obtained from other aircraft 210 or other agencies 220 via the data input unit 15 and datalink subsystem 24. The provided information may include, but is not limited to, aircraft call sign, position, speed, altitude and heading, which may be displayed on the graphical user interface (GUI) 10 and used to select particular aircraft for which the trajectory is to be optimized or to formulate constraints in the optimization process.

In an example embodiment, the GUI 10 is designed to support manual as well as automatic entry of all the data required for optimization of flight trajectory. The GUI 10 includes control of and interaction with the optimization process carried out by the optimizer module 8 and provides for the visualization of trajectories and other features relevant to the user such as the position of other traffic and geographical features. In an example embodiment, flight path information can be obtained directly from the database subsystem 12 and other data, such as weather (wind and temperature) information can be obtained automatically through communication with the relevant subsystems 12, 14, 20, 22 and 26.

The GUI 10 includes a selection module 3, a data input module 4 and a visualization module 5. The selection module 3 enables a user 200 of the tool 1 to select relevant parameters such as the model of a specific aircraft and a flight plan for optimization from the database subsystem 12 from the database subsystem 12. The GUI 10 also allows the user, through the data input module 4, to input or vary any necessary data or parameter that may be specific to a particular trajectory segment of flight plan to be optimized and is that not stored in the database subsystems such as the database subsystem 12, the weather subsystem 20, traffic subsystem 26 and ATC subsystem 22. In addition, the data input module 4 also allows data entered manually into the tool 1 and stored in the said subsystems 12, 20, 22 and 26.

Figure 3:
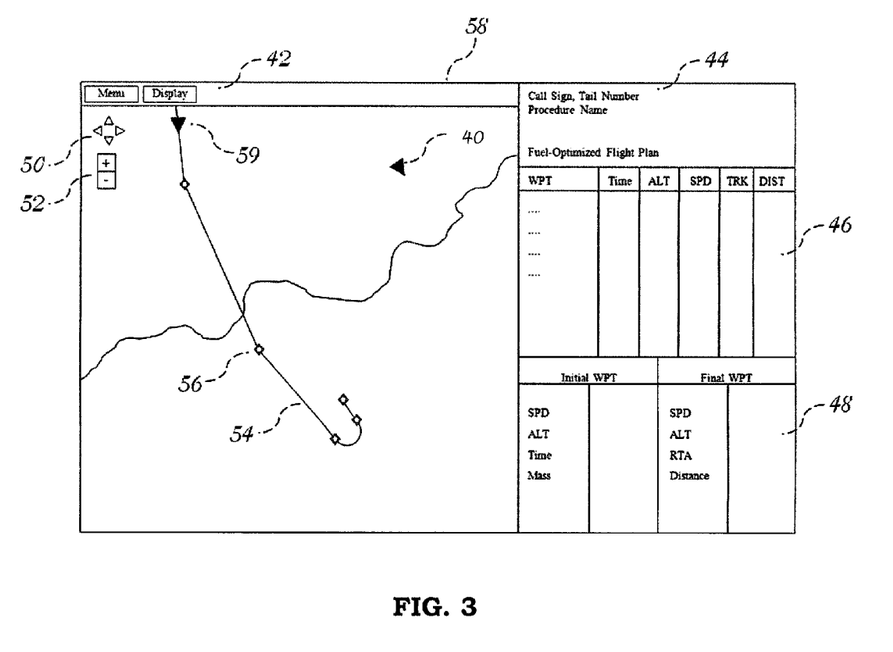
FIG. 3 shows an example graphic generated by the graphical user interface of the tool in FIG. 1.

The visualization module 5 of the GUI 10 provides for the visualization of trajectories and other features relevant to the user such as the position of other traffic and geographical features. Accordingly, the visualization module is capable of displaying the trajectory 54 of the flight plan selected from the database subsystem 12 overlayed graphically on a geographic map 40 that is stored within the database subsystem 12. An example visualization graphic 58 is shown in FIG. 3. Typically, a trajectory is defined by a plurality of waypoints 56 stored in the database subsystem 12. Specific parts of the trajectory to be optimized can be selected by the user through the graphical selection of two (the initial and final) waypoints via the use of an input device such as a mouse, touch screen or tracker ball. The data pertaining to the selected part of the trajectory are then passed from the visualization module 5 to the selection module 3, which handles data pertaining to the selected part of the trajectory to be optimized. In a present embodiment, the visualization module 5 is also capable of displaying traffic data received from the traffic subsystem 26 on the display as represented by visualization graphic shown in FIG. 3. The visualization module 5 is also capable of graphical manipulations that are known, such as panning and zooming which may be achieved by selecting the appropriate icons 50 and 52 via an input device such as a mouse, touch screen or tracker ball, that forms part of the data input unit 15. It is understood that various forms of display features associated with, but not limited to, panning, zooming and rotation of the graphic or parts thereof form part of the disclosure.

In an example embodiment, details pertaining to the flight plan may also be displayed in textual format on a side pane 46 of the graphic 58. Data pertaining to the initial and final operating conditions of the selected section of flight path to be optimized are displayed on a second side pane 48, what those pertaining to the aircraft are displayed on a third side pane 44. It is understood that this and other data may be displayed in other configurations and formats. The textual data displayed on the graphic 5 generated by the visualization module may be altered by the user 200 via an input device such as a keyboard, touch screen, mouse or tracker ball within the data input unit 15 and the newly entered data is then stored within the database subsystem 12. In a present embodiment, on side pane 46, data pertaining to the section of the flight plan selected for optimization is displayed in a colour that is different from that used to display data relating to the rest of the flight plan.

In an example embodiment, parameters in the optimization process, such as aircraft weight and, potentially, cost index, are considered to be included in the flight plan data, which may be updated in real-time by the aircraft 210 to reflect more recent estimates of aircraft actual weight. In one embodiment, the side pane 46 incorporates a flight plan table 46 that lists waypoints 56 in sequential order and allows the deletion and addition of waypoints 56 by the user to alter the plan path of the trajectory to be optimized. Time, speed and altitude constraints can be defined by the user at different waypoints on the flight plan table in side pane 46 and this information is stored in the ATC subsystem 22. In an example embodiment, constraints can take the form of AT OR ABOVE, AT OR BELOW, or AT a specific threshold or value.

The optimizer module 8 within the tool 1 optimizes the section of the flight plan selected for optimization by the user 200. The optimizer 8 uses optimization algorithms, such as those using evolutionary techniques and optimal control theory. In a present embodiment, the optimizer module 8 accesses the necessary models within the models subsystem 14 (such as those pertaining to aircraft performance) as well as weather information from the weather subsystem 20, ATC constraints from the ATC subsystem 22 and traffic information from the traffic subsystem 26.

The optimizer module 8 optimizes the flight trajectory for one or a plurality of objectives that are entered by the user 200 in the data input module 4 or visualization module 5 of the GUI 10. For example, one objective may be the minimization of fuel burn. Another objective may be the minimization of flight time. A further objective may be the minimization of emissions. Yet another objective may be the minimization of perceived noise generated by the aircraft. For example, a trajectory may be optimized for minimum fuel burn or minimum flight time, or a balance between the two. Alternatively, flight time may be defined as an ATC constraint in the ATC subsystem 22, in which case the optimizer 8 may generate speed and altitude schedules for minimum fuel burn for the specified flight.

Figure 4:
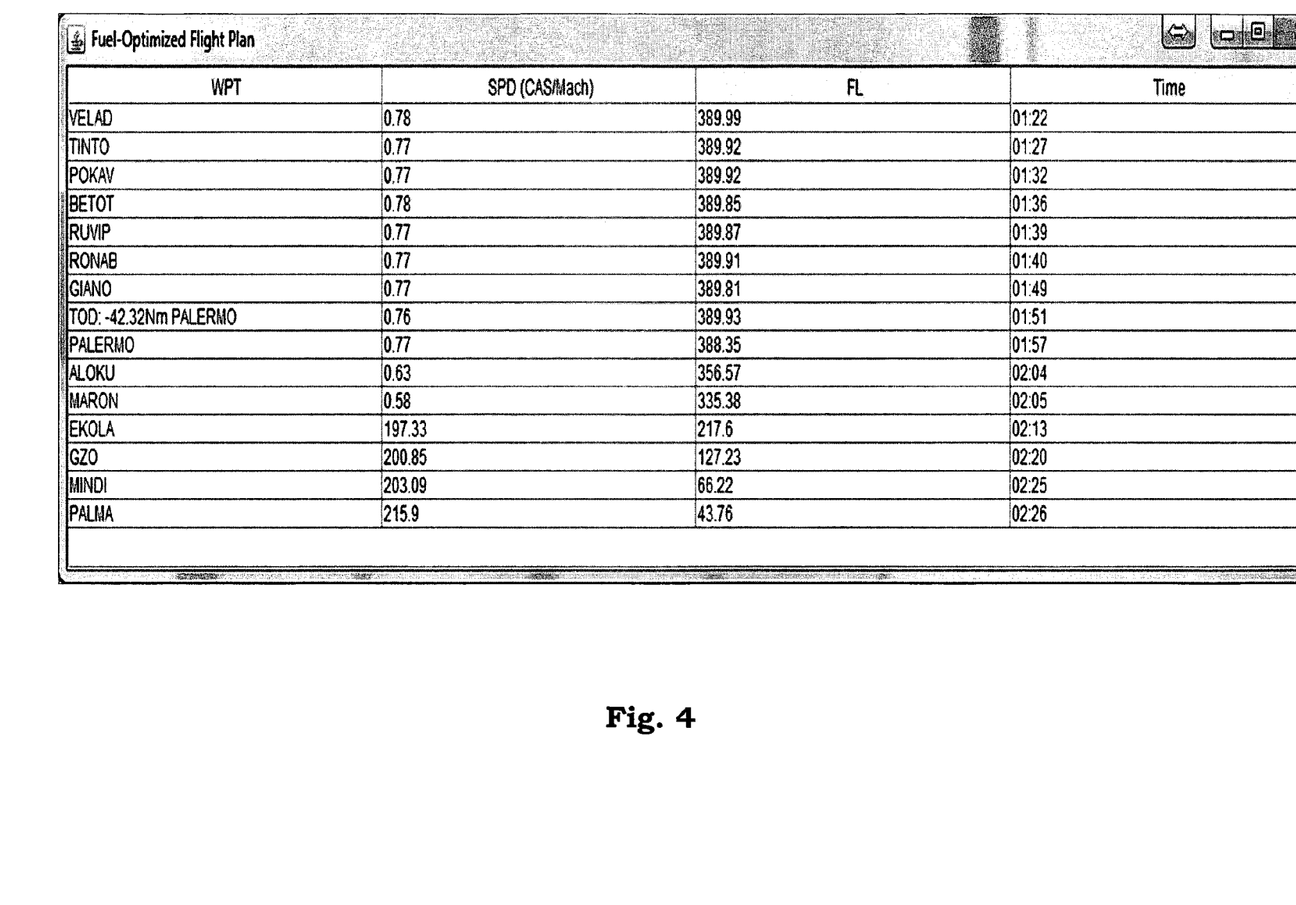
FIG. 4 shows an example graphic generated by the graphical user interface of the tool in FIG. 1, showing a fuel-optimized flight plan created in accordance with the functions of the tool of FIG. 1.
Figure 5:
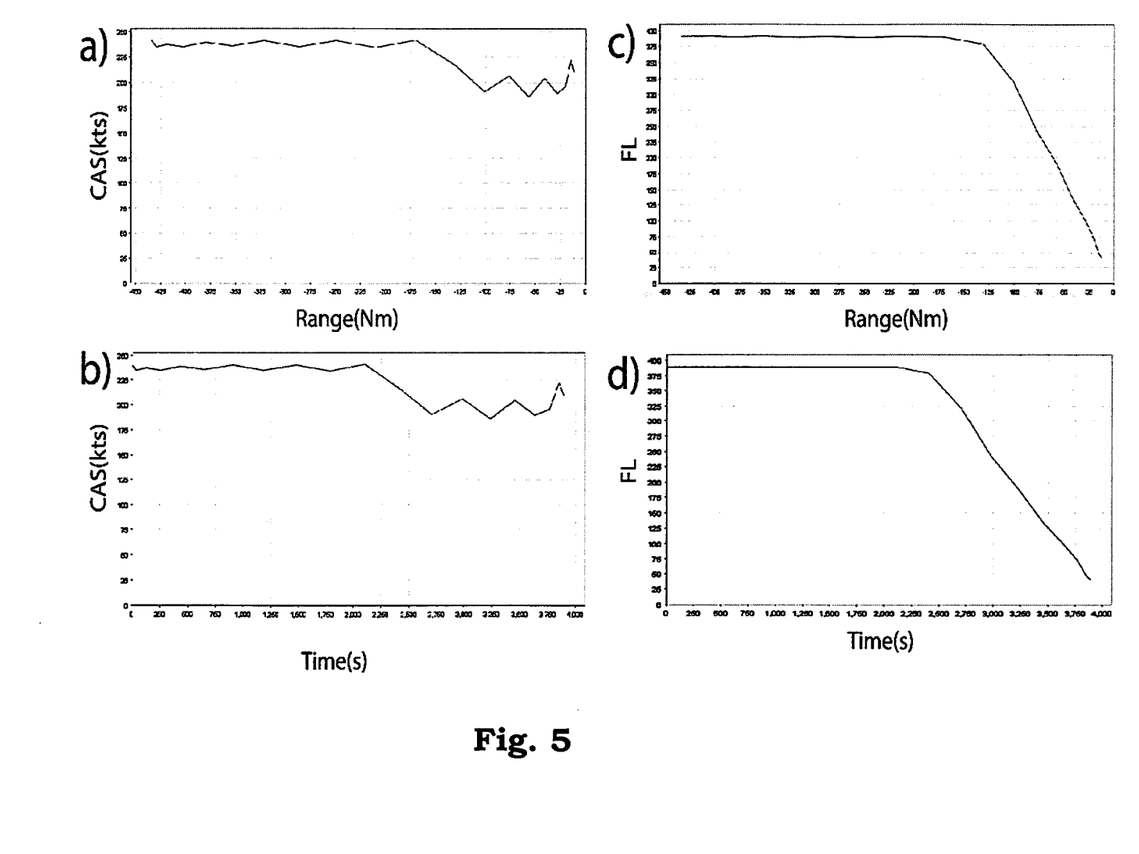
FIG. 5 illustrates an example graphic generated by the graphical user interface of the tool in FIG. 1, showing the profiles pertaining to the optimized trajectory of a flight.

When the optimization process for the selected section of the flight plan is complete, the optimization module 8 outputs the result to the output unit 6 of the tool 1. The output unit 6 formats the optimized trajectory in a format that can be used by the user 200 or the aircraft 210. Example formats of an optimized trajectory, which is useful for pilots and systems on board the aircraft 210 involve speed and altitude schedules, as this allows pilots a simple way to program aircraft systems such as the flight guidance and flight management systems. It is understood that the output unit 6 can re-format the optimized trajectory in different ways as may be appropriate for the particular application. For example, the output unit 6 also formats the data in tabular format for display by the visualization module 5 in tabular format as shown in FIG. 4 and in graphical formats as shown in FIG. 5. Example data input to the optimizer 8 includes track miles to be flown in the trajectory segment to be optimized and trajectory segment start and end point altitudes. Such data may be extracted or derived from the flight plan.

Constraints along the trajectory, such as those pertaining to speed and altitudes at specific points on the trajectory, are retrieved from the relevant databases of the database subsystem 12. It is understood that different trajectory parameters may be retrieved, that trajectory profiles may be described in different formats and other criteria, such as emissions may be included in the optimization in different embodiments of the present invention. In the present embodiment, these computations are based on pseudospectral techniques.

In an example embodiment, the optimizer 8 generates a trajectory defining the speed and altitude schedules along the plan path, as well as, where applicable, salient points such as Top of Climb (ToC) or Top of Descent (TOD). These points are transferred to the output unit 18 that handles the data and formats it into forms compatible with other internal subsystems and external systems. For example, the output unit 18 formats data for display of the trajectory on the GUI 10 on the display 19. This supports the visualization of the optimized trajectory by the user 200. The output unit 18 may also format the data in a way that is compatible with existent ATC formats or other datalink formats that allow transfer of the data to an aircraft. The output unit 18 further transfers data to other agencies 220 via the datalink subsystem 24 and data output unit 18.

The tool 1 can be configured to operate in one or a plurality of operating environments, such as in the cockpit, in an AOC or within ATC. This may result in variations of the described embodiment. For example, in a present embodiment for use by pilots on the flight deck, the computing device 90 is a tablet and therefore the traffic subsystem may not be implemented as it is not used. In such an embodiment, the user 200 is the pilot or pilots who manually enter the data via the touch screen of the tablet, which forms part of the data input unit 15 and reads the speed and altitude schedules of the optimized trajectory generated by the optimizer module 8 and displayed by the visualization module 5 to then program the flight management system or the autopilot of the aircraft 220 or fly the aircraft 220 manually.

It is understood that in yet other embodiments the tool 1 within the computing device 90 may connect with the systems of the aircraft 220 via a wired or wireless link implemented in the data input unit 15 and the data output unit 18. This would allow the automatic transfer of data pertaining to, for example, flight management and air data. Likewise, the computing device 90 may also communicate with other agencies 220 via the data input unit 15 and data output unit 18 which, in such an implementation, may include other aircraft or weather stations for the collection of weather data, ATC for ATC constraints and clearances, and the AOC for information purposes.

When the tool 1 is configured to operate as a ground-based tool, either within an AOC or ATC, the user 200 may communicate data pertaining to the optimized flight trajectory such as speed and altitude schedules to the pilot or pilots on board the aircraft 210 via voice radio. Alternatively, the computing device 90 may communicate with the systems on board the aircraft 220 via a wireless data link implemented in the data input unit 15 and data output unit 18 and with other agencies (which may include ATC in the case the tool is used by an AOC and vice versa) via a wired or wireless link.

In an example embodiment the GUI 10 as shown in FIG. 3, a menu bar 42 with a movable map 40 with zoom and pan functions are controlled by pan buttons 50 and zoom buttons 52, respectively. Different aircraft (traffic) 59 may be displayed and one or more aircraft may be selected by an input device such as a mouse to display its planned plan path 54 defined by the flight plan. In an example embodiment, placing a cursor or other pointing device on an aircraft symbol 59 will temporarily display information such as call sign, type, etc. on the map 40 adjacent to the said aircraft symbol. The optimizer 8 may also be initiated by the GUI 10. In an example embodiment, the GUI 10 may include a graphical or virtual button to initiate the optimizer 8.

If the tool 1 is being used by an AOC, it may be relevant to transmit the optimized trajectory to ATC (agency 220), as well as the associated aircraft 210 to allow pilots to fly the proposed trajectory. When the tool 1 is used by ATC, data may be transmitted to the AOC and relevant aircraft, whilst when the tool 1 is used on the flight deck, data may be transmitted to ATC and the AOC. It is also possible that if the tool 1 is installed on a portable device on the flight deck, the tool 1 would transmit data to appropriate aircraft systems, such as the Flight Management System (FMS). Alternatively, the pilot may input relevant data pertaining to the optimized trajectory manually into the FMS. In the case of the tool 1 being on the ground, data pertaining to the optimized trajectory, such as operating speed and other salient information such as altitudes or the ToC or TOD points may be relayed to the pilots via voice radio and the pilots can then program the FMS accordingly.

In an example embodiment, the GUI 10 can also display speed and altitude schedules and other information such as expected time of arrival (ETA) for various waypoints and other salient points pertaining to the optimized trajectory. An example display is shown in FIG. 4. The GUI 10 may also display data pertaining to the optimized trajectory in graphical format such as that shown in FIG. 5 including waypoints (WPT), calibrated airspeed (CAS) and flight level (FL).

Figure 6:
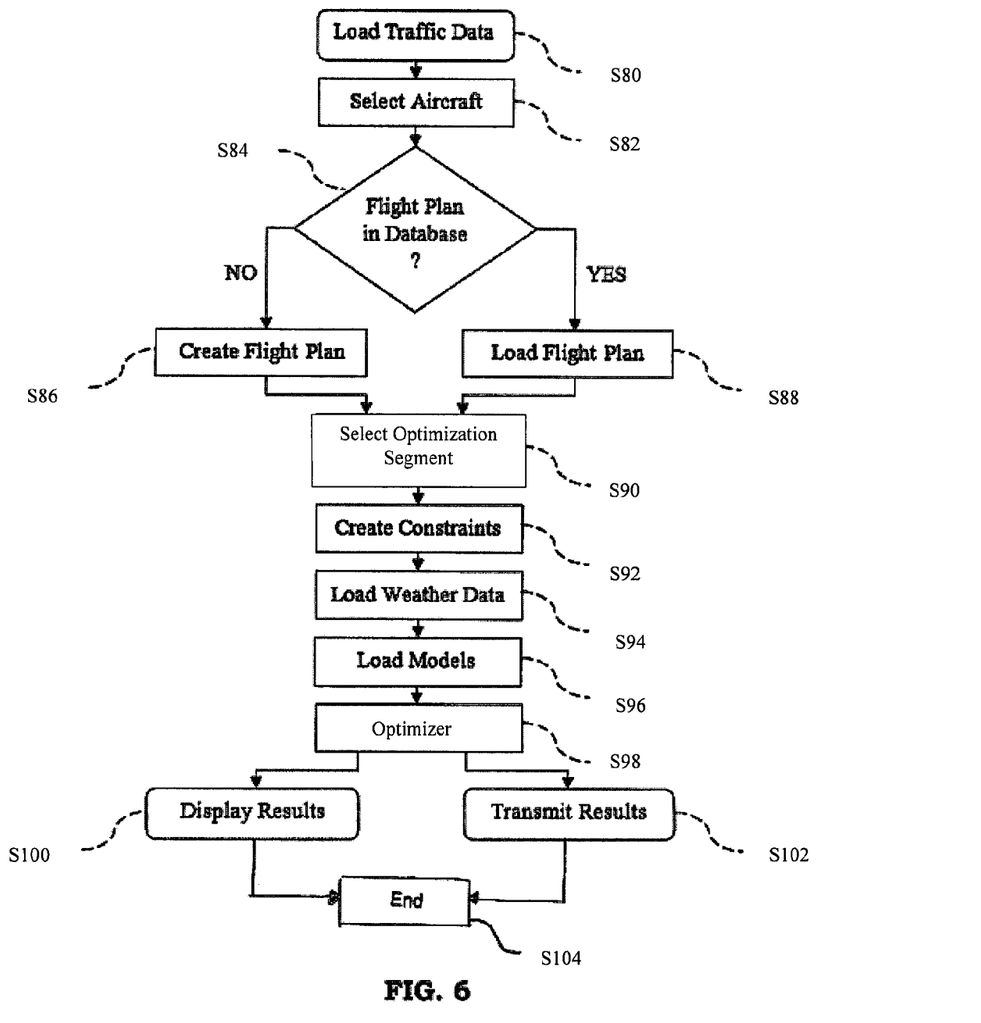
FIG. 6 is a flowchart of an example process of optimizing trajectories via the tool of FIG. 1.

The process of optimizing a flight trajectory using the tool 1 and system 100 as presented in a present embodiment is shown in FIG. 6. According to example embodiments, each of steps illustrated in FIG. 6 may be performed by a combination of inputs by the user 200 and execution of processes by the tool 1 operating in the system 100, where the memory 17 stores executable instructions corresponding to the relevant steps illustrated in FIG. 6, and the processor 13 performs the operations corresponding to the steps illustrated in FIG. 6. According to example embodiments, received data, including weather, traffic, etc., from databases/subsystems may be received through the data input module 4, and data produced as a result of performing the steps illustrated in FIG. 6 may be output to an external entity via the data output unit 18 and/or displayed on the display unit 19.

The steps illustrated in FIG. 6 may be embodied in the form of computer code stored in a tangible non-transitory computer readable medium including, for example, an optical disc, flash drive, HDD, or other known types of such computer readable media. The computer code includes instructions capable of causing a computer to perform operations corresponding to the steps illustrated in FIG. 6.

In the first step of the optimization process shown in FIG. 6 (step S80), the tool 1 automatically collects the latest updated data pertaining to weather and traffic from other agencies 220 and stores it in the memory 17. Weather data, obtained from weather agencies, includes, but is not limited to, ambient temperature, pressure, wind speed and direction at different altitudes and geographic positions and is handled by the weather subsystem 20. Traffic data is obtained from ATC or AOC systems and is handled by the traffic subsystem 26 and includes a list of aircraft from which the user 200 can select the aircraft for which a segment of the trajectory will be optimized; together with associated data pertaining to each aircraft and its flight such as its weight, position, altitude, speed and flight plan. The flight plan of each aircraft is stored in the database subsystem 12. The selection module 3 of the GUI 10 generates a table of aircraft from which the user 200 can select one on which the trajectory optimization process will be performed. Traffic data is, in a present airborne embodiment of the tool 1, only related to the ownship and this is obtained from the systems of the aircraft 210 such as the flight management system and air data system. Alternatively, the user 200 may enter the data, or parts thereof, manually using the data input device 15 and the input module 4 of the GUI 10. The visualization module 5 is capable of displaying the traffic overlayed on a map in the format as shown in FIG. 3 using symbols 59 to represent traffic.

Next, in step S82, the user 200 selects the aircraft of interest from the table generated by the selection module 3 of the GUI 10. This can be done by either selecting the aircraft of interest from the table generated by the selection module 3 or by graphically selecting (using, for example a mouse 15) the relevant aircraft symbol 59 displayed on the map generated by the visualization module 5 (FIG. 3). In the latter case, the user 200 has the opportunity to pan and zoom on the map using the virtual buttons 50 and 52 to bring the aircraft of interest into view.

Once the aircraft of interest is selected, the tool 1 seeks the flight plan associated with the selected aircraft (step S84) in the database subsystem 12 and loads it into the memory unit 17 (step S88). If, for any reason, the flight plan is not found in the database subsystem 12, the user is prompted by the data input module 4 to manually enter the flight plan details via the GUI 10 (step S86). This can be done via the data input module 4 or via the side pane 46 of the graphic 58 generated by the visualization module 5 (FIG. 3). Flight plan details entered generally include a waypoint name and the time, altitude and speed at/with which the aircraft will overfly it. The tool 1 may then automatically generate the distance to the next waypoint and ground track resulting from the leg joining two successive waypoints and display these data on the side pane 46. Once the flight plan is entered manually it is stored in the database subsystem 12. Furthermore, once a flight plan is identified, it is displayed on the graphic 58 generated by the visualization module 5 as shown in FIG. 3.

Next, the user 200 needs to select the segment of the flight that is to be optimized (step S90) via the graphic 58 generated by the visualization module 5. This can be achieved using a mouse to select respective initial and final waypoints that are either displayed on the map (such as waypoint 56 in FIG. 3) or else as listed in the side pane 46. In a present embodiment, by selecting (by, for example clicking with a mouse or touching the touch screen on) the region of 'Initial WPT' and 'Final WPT' in side pane 48 will cause the visualization module 5 to display drop-down menus to allow the user 200 to textually enter the initial and final waypoints and associated operating conditions (such as speed, altitude and time) via a keyboard.

Once the segment of the flight that is to be optimized is identified, the user 200 can then also manually introduce constraints at each waypoint in the flight plan in pane 46 (step S92). This is of relevance because such constraints will condition the solutions generated by the optimizer module 8. The tool 1 may also automatically introduce additional constraints held within the AC subsystem 22.

The tool 1 then loads weather information (such as wind speed, direction, temperature and pressure along the flight path at various relevant altitudes) stored in the weather subsystem 20, whilst the user 200 also has the opportunity to enter such information manually via the data input module 4 (step S94).

Next, the tool 1 selects the correct models relevant to the selected aircraft from a selection of models held in the models subsystem 14. It is recalled that the models subsystem 14 holds models for different aircraft types and the tool 1 selects the models (such as engine and aircraft performance models) relating to the specific aircraft for which the trajectory is to be optimized by linking the aircraft type to the relevant models via relational databases stored in the database subsystem 12. The selected models are retrieved from the models subsystem 12 and loaded into the memory unit 17 (step S96). At the end of step S96, the optimization setup is complete with all the necessary models selected and relevant data available, and is ready for execution of the optimization process.

The tool 1 then waits for the user 200 to start the optimization process. This is achieved through the GUI 10 via an input device in the data input unit 15. In a present embodiment, the GUI 10 generates a pop-up window asking the user to click on (or touch, with a touch screen) a virtual button to initiate the optimization process once step S96 is complete.

The tool 1 then performs the optimization process (step S98) via the optimizer module 8. At the end of this process, the optimizer module 8 will have generated an optimized trajectory according to the selected optimization criterion or combination of criteria, thereby allowing the aircraft 220 to be operated with improved fuel efficiencies and economies, for example.

The data pertaining to the optimized trajectory is stored in the memory unit 17. In a present embodiment, the data pertaining to the optimized trajectory includes speed and altitude schedules that also define salient points in a flight path such as the position of the bottom and top of climbs and descents.

The tool 1 then displays data pertaining to the optimized trajectories via the visualization module 5 of the GUI 10 (step S100). In a present embodiment, the data is listed in tabular format in side panes 46 and 48 of the graphic 58 shown in FIG. 3 and is also displayed graphically according to FIG. 5. It is understood that these are example embodiments and that variations in the method of displaying the information can be made within the context of the current invention. For example, for a present embodiment for use by pilots on the flight deck, the data for an optimized descent includes distance, in track miles, the top of descent point from the nearest waypoint on the flight plan and this may also be displayed and highlighted in the side pane 46.

The user 200 can then use the displayed information to either, in the case of a ground-based embodiment, relay the information to the pilot of the aircraft 210 via, for example but not limited to, wireless (radio) voice communication, or, in the case of an airborne embodiment where the user 200 is the pilot, or fly the aircraft according to the optimized trajectory. This can be done in a number of ways such as manually programming the flight management system or the autopilot of the aircraft 220 or manually flying the aircraft 220.

Optionally, the tool 1 also transfers data pertaining to the optimized trajectory to other parts of the system 100 that are external to the computing device 90 in step S102. In a present embodiment, the tool 1, in step S102, transfers the data to other agencies 220. It is understood that the tool 1 may likewise transfer data to systems such as the autopilot or flight management system on board the aircraft 210, allowing the said aircraft to automatically fly the optimized trajectory and thus affording improved fuel efficiencies and economies.

The process ends at step S104.

Figure 7:
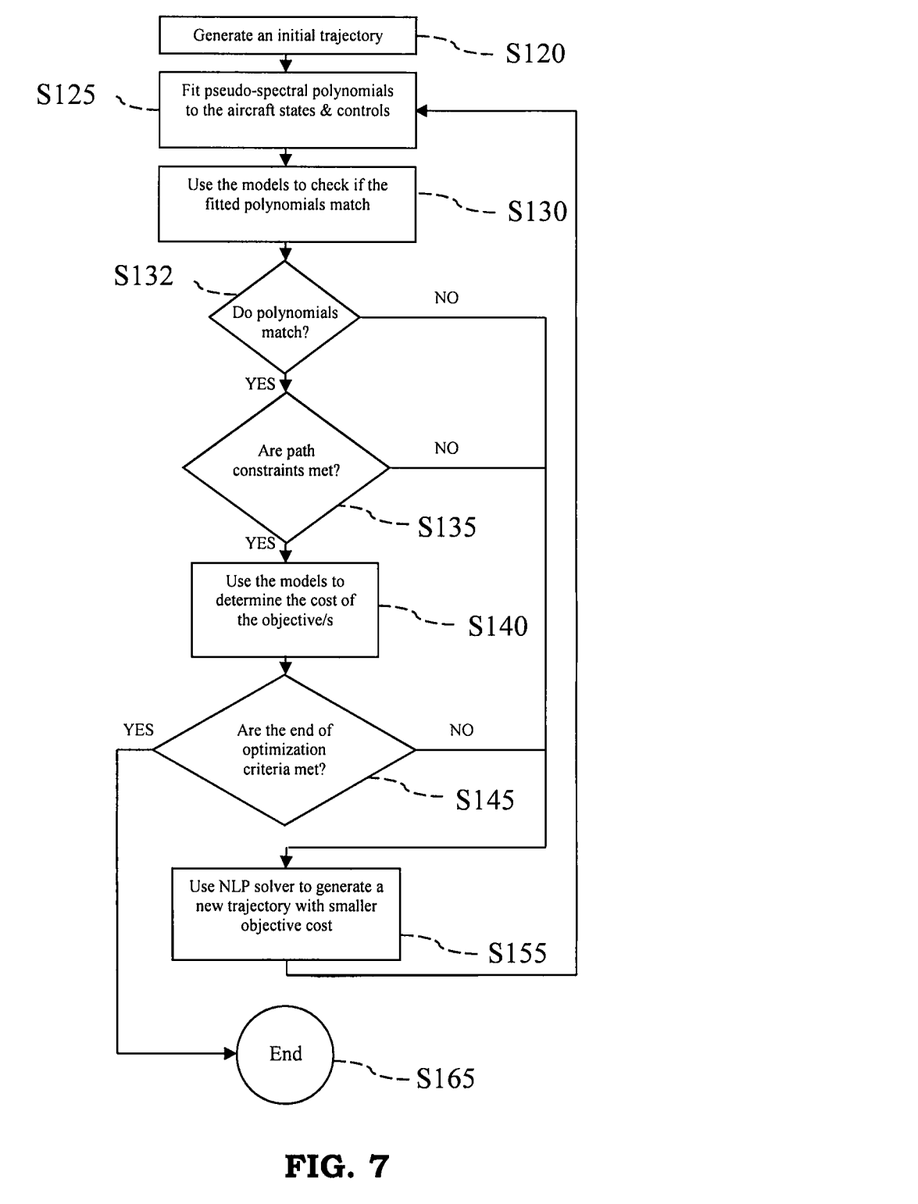
FIG. 7 presents a flowchart of an example optimization process of step of FIG. 6 using a pseudo-spectral technique to optimise flight trajectories.

The optimization process executed in step S98 can involve one or a combination of a plurality of optimization techniques such as those based on evolutionary (eg. genetic algorithms) and optimal control techniques. In a present embodiment, the optimization process uses pseudo-spectral techniques, which form a sub-set of optimal control techniques. FIG. 7 presents a flow chart of the steps involved in the process of optimizing a flight trajectory using pseudo-spectral techniques in a present embodiment.

Accordingly, the process first involves the optimizer module 8 generating an initial trajectory of the selected flight path segment obtained from step S90 (step S120). Advantageously, the initial trajectory is taken directly to be that of the flight plan resident in the database subsystem 12 which may have been altered by the user 200 via the GUI 10.

The optimizer module 8 then fits pseudo-spectral polynomials to the aircraft states (such as altitude and speeds at arbitrary points on the trajectory) and controls in step S125. Aircraft controls are the inputs that dictate the states of the aircraft and, in a present embodiment, include thrust setting and elevator position. Other controls such as, but not limited to, aileron and spoiler position may be used as controls. Polynomials are fitted using known techniques which, in a present embodiment uses the least squares mathematical method.

Next, in step S130, the aircraft and atmospheric models obtained from the models subsystem 14 in step S96, together with data such as that pertaining to the weather and operational constraints obtained in steps S94 and S92 respectively, are used to check whether the polynomials representing the aircraft controls generated in step S125 result in a trajectory with the aircraft states defined by the polynomials representing the aircraft states, also generated in step S125. This step is carried out to ensure that the polynomials are coherent.

If the polynomials are found to be coherent (step S132), then the process checks, in step S135, whether the trajectory defined by the polynomials of the aircraft states falls within the path constraints obtained from step S92. If this is the case, the process proceeds to step S140, in which the cost of the optimization objective or combination of objectives is calculated. In a present embodiment, the optimization objective is the minimization of fuel burn. In this embodiment, therefore, in step S140 the total amount of fuel that will be burnt in the flight segment being optimized is calculated.

Once the cost of the objective is computed, the process proceeds to step S145. In this step, the process determines whether the optimization process is complete or otherwise according to pre-defined stopping criteria. Stopping criteria may include, but are not limited to, a maximum number of iterations or the improvement in objective cost achieved over the previous iteration being below a minimum threshold.

If the stopping criteria are not met, the process stores the trajectory in the memory unit 17 and generates a new trajectory with a smaller cost function in step S155. The new trajectory is generated using known non-linear programming (NLP) solvers and this trajectory is then used in a repeat process that starts again at step S125, thus creating an iterative loop that is typical and known in numerical optimization processes.

If the stopping criteria are met in step S145, the process ends and the final trajectory calculated is a trajectory that is optimized, according to the expected operating conditions (such as wind, temperature, operating weight, and ATC constraints) to minimize the cost the selected optimization criterion or combination of criteria. This trajectory is the output of the optimizer module 8 in step S98 of the process described in FIG. 6. The process ends at step S165.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method of selecting an aircraft operating condition, the method comprising:
acquiring a flight plan of an aircraft;
at least one of inputting or acquiring, during or preceding a flight, data pertaining to expected operating conditions of the flight into a processing device;
displaying the flight plan;
selecting a segment along the flight plan to be optimized;
determining track miles to be flown within the selected segment;
determining start and end point altitudes to be flown for the selected segment;
determining, via the processing device, an optimized aircraft operating condition for a vertical profile during descent or climb for the track miles to be flown within the selected segment of the flight plan, according to the determined start and end point segment altitudes, expected conditions and operational constraints along the flight plan using a mathematical optimization technique;
selecting the optimized aircraft operating condition for the vertical profile; and
displaying the optimized aircraft operating condition and the selected vertical profile on a display.

2. The method of claim 1, wherein the aircraft operating condition for the vertical profile of the aircraft refers to a segment of the flight or the flight in its entirety.

3. The method of claim 1, wherein the vertical profile is optimized for one or a plurality of criteria.

4. The method of claim 3, wherein optimization criteria include fuel burn, operational cost, emissions, flight time and noise.

5. The method of claim 1, wherein the mathematical optimization technique includes application of pseudo-spectral techniques stored in a memory and executed by the processing device.

6. The method of claim 1, further comprising selecting a set of models from a plurality of sets of models stored in a database to be applied in the mathematical optimization technique.

7. The method of claim 1, wherein the data pertaining to the expected operating conditions of the flight include aircraft weight, speed, altitude and position, and atmospheric conditions, including temperature, pressure, wind speed and direction.

8. The method of claim 1, wherein operational constraints are used to determine the selected operating condition for the vertical profile.

9. The method of claim 8, wherein the operational constraints include air traffic constraints and time of flight.

10. The method of claim 1, wherein data pertaining to the expected operating conditions and operational constraints are obtained digitally from one or a plurality of external sources.

11. The method of claim 10, wherein one of the external sources is an aircraft system.

12. The method of claim 10, wherein one of the external sources is an air traffic control system.

13. The method of claim 1, further comprising displaying, on a graphical display, data and indicia pertaining to the future positions of one or a plurality of aircraft based on their selected operating condition for the vertical profile.

14. The method of claim 13, wherein the data displayed includes the time, altitude and speed at which the aircraft is expected to be at the displayed position; and geographic points of relevance to the selected vertical profile of the aircraft.

15. The method of claim 1 further comprising communicating with aircraft and entities.

16. The method of claim 15, wherein data pertaining to the selected aircraft operating condition for the vertical profile are communicated with aircraft and other entities.

17. A system for selecting an aircraft operating condition for a vertical profile of an aircraft, that determines, during or preceding a flight, an aircraft operating condition for the vertical profile according to expected conditions using a mathematical optimization technique, the system comprising:

a data acquisition device configured to acquire a flight plan of the aircraft and data pertaining to expected aircraft operating conditions of the flight;

a selecting device to select a segment along the flight plan to be optimized;

a data processing device configured to determine, during or preceding the flight, an optimized vertical profile for track miles to be flown within the selected segment of the acquired flight plan, according to start and end point altitudes to be flown for the selected segment of the acquired flight plan, expected conditions and operational constraints along the flight plan using the mathematical optimization technique;

a memory;

a display configured to display the flight plan and the optimized vertical profile; and     a communication device through which the system can communicate with other systems and an output device to generate outputs pertaining to the determined vertical profile.

18. The system of claim 17, wherein the output device includes the display.

19. The system of claim 17, wherein the communication device includes one or a plurality of datalinks.

20. The system of claim 19, wherein the communication device is a wireless data link.

21. The system of claim 17, wherein the communication device is configured to communicate with an aircraft system.

22. The system of claim 17, wherein the communication device is configured to communicate with other ground-based systems.

* * * * *